US012451654B2

(12) United States Patent
Dower

(10) Patent No.: US 12,451,654 B2
(45) **Date of Patent: *Oct. 21, 2025**

(54) NON-SHORTING ELECTRONICS JACK

(71) Applicant: Erik Dower, Las Vegas, NV (US)

(72) Inventor: Erik Dower, Las Vegas, NV (US)

( * ) Notice: Subject to any disclaimer, the term of this patent is extended or adjusted under 35 U.S.C. 154(b) by 185 days.

This patent is subject to a terminal disclaimer.

(21) Appl. No.: 18/239,338

(22) Filed: Aug. 29, 2023

(65) Prior Publication Data

US 2024/0162657 A1 May 16, 2024

Related U.S. Application Data

(63) Continuation-in-part of application No. 17/988,026, filed on Nov. 16, 2022.

(51) Int. Cl.
*H01R 13/639* (2006.01)
*H01R 13/04* (2006.01)
*H01R 13/422* (2006.01)

(52) U.S. Cl.
CPC ........... *H01R 13/639* (2013.01); *H01R 13/04* (2013.01); *H01R 13/422* (2013.01)

(58) Field of Classification Search
CPC ......................... H01R 13/7033; H01R 13/111; H01R 13/502; H01R 31/065; H01R 13/40; H01R 24/58; H01R 2103/00
See application file for complete search history.

(56) References Cited

U.S. PATENT DOCUMENTS

| | | | | |
|---|---|---|---|---|
| 4,165,147 A * | 8/1979 | Buck | H01R 24/58 | 439/668 |
| 4,426,558 A * | 1/1984 | Tanaka | H01R 24/58 | 200/51.09 |
| 5,550,755 A * | 8/1996 | Martin | H04H 60/04 | 348/E5.022 |
| 7,988,498 B1 * | 8/2011 | Lim | H01R 24/58 | 439/669 |
| 8,033,860 B2 | 10/2011 | Milstein et al. | | |
| 2002/0039851 A1 * | 4/2002 | Mou | H01R 13/7032 | 439/188 |

(Continued)

OTHER PUBLICATIONS

Wenzhou QingPu Electronics Co., Ltd, WQP-WQP518MA, http://www.qingpu-electronics.com/en/products/WQP-PJ398SM-362.html, retrieved Nov. 16, 2022.

(Continued)

*Primary Examiner* — Edwin A. Leon
(74) *Attorney, Agent, or Firm* — Florek & Endres PLLC

(57) ABSTRACT

A jack for receiving a plug to make an electrical connection, the plug having a plug sleeve contact and a plug tip contact separated by a plug insulator, the jack having a jack sleeve contact forming a gap with the plug sleeve contact when the plug is not fully inserted into the jack, a jack tip contact configured to create an electrical connection with a plug tip contact when the plug is fully inserted into the jack, and a dog that imparts movement to the jack sleeve contact when the plug is inserted into the jack, the dog acting on the jack sleeve contact to complete an electrical connection with plug sleeve contact. This provides that the plug tip is electrically protected from completing an electrical connection with the jack sleeve contact prior to full insertion of the plug into the jack.

13 Claims, 14 Drawing Sheets

(56) References Cited

U.S. PATENT DOCUMENTS

| | | | | |
|---|---|---|---|---|
| 2009/0011628 | A1* | 1/2009 | Purchon | H01R 13/7031 439/188 |
| 2011/0076896 | A1* | 3/2011 | Jol | H01R 13/187 29/863 |
| 2024/0162667 | A1* | 5/2024 | Dower | H01R 13/111 |

OTHER PUBLICATIONS

Tiptop Audio, Stackcable Stackcable Shielded 3.5mm Patch Cable, https://tiptopaudio.com/stackcable/, retrieved Nov. 16, 2022.
Modular Addict, Stacking Patch Cables—Black, https://modularaddict.com/parts/cables/stacking-patch-cables-black, retrieved Nov. 16, 2022.
CLIFF Electronic Components, Professional Jack Sockets, https://www.cliffuk.co.uk/products/jacksockets/index.htm, retrieved Nov. 16, 2022.

* cited by examiner

NON-SHORTING ELECTRONICS JACK

REFERENCE TO RELATED APPLICATION

This application is a continuation in part of U.S. patent application Ser. No. 17/988,026 filed Nov. 16, 2022, now pending.

FIELD OF THE INVENTION

The present invention relates to an electronics jack, such as a phone connector, and more particularly to an electronics jack for connecting a signal and an electrical ground from an electrical plug that avoids grounding the signal prior to connection of the signal and the ground.

BACKGROUND OF THE INVENTION

Electronics jacks are used in many consumer electronic devices, commercial audio components, and the like, including such things as headphones, modular synthesizers, etc. These generally comprise two or more electrical conductors, i.e., tip/sleeve (signal/ground), tip/ring/sleeve (left/right/ground), tip/ring/ring/sleeve, etc., for connecting one or more electrical signals and an electrical ground from an electronics plug. These jacks and plugs work together to provide a removable electrical connection.

In a usual embodiment, such as a 3.5 mm mini mono audio plug/jack, the plug includes a tip conductor for carrying a signal and a shaft conductor for an electrical ground and the jack includes a base conductor for carrying the signal and a sleeve conductor for the electrical ground. Upon full insertion of the plug into the jack, the tip conductor on the plug contacts the base conductor on the jack while the shaft conductor on the plug contacts the sleeve conductor on the jack, thereby completing the electrical connection between the plug and the jack.

However, prior art plugs/jacks permit the signal to be grounded prior to proper connection of the electrical signal between the plug and jack, generally when the tip conductor of the plug makes contact with the sleeve conductor of the jack before the plug is fully inserted into the jack. Connecting the signal at the time of or prior to connecting the ground, by contacting the tip and base conductors prior to contacting the shaft and sleeve conductors, results in a cleaner electrical connection.

More specifically, grounding the signal prior to the connection of the electrical signal and ground contacts in the plug and jack cause signal dropouts and excess current draw that create signal disruption and audio distortion. In most cases, signal dropouts are not considered a significant problem and excess current draw has been limited in circuit design. However, in some circumstances, such as in modular synthesizers, signals are passively multiplied to multiple destinations, so a signal dropout causes disruption. This makes it difficult to patch cables during a live performance, recording session or broadcast.

Therefore, there is a failure in the art to provide a solution for permitting a user to connect electronics plugs and jacks without signal grounding that creates dropouts and excess current draw, causing signal disruption and audio distortion.

SUMMARY OF THE INVENTION

The present invention is directed to an embodiment of an electronics jack comprising a jack for receiving a plug to make an electrical connection, said plug having a plug sleeve comprising a plug sleeve contact and a plug tip comprising a plug tip contact. Of course, the jack of the present invention can be configured with additional electrical conductors, i.e., tip/ring/sleeve (left/right/ground), tip/ring/ring/sleeve, etc., for use with a corresponding electronics plug to provide a removable electrical connection. However, the concept can be readily understood by reference to the tip/sleeve configuration, understanding that rings can be added without deviating from the present invention described here.

The jack comprises a jack sleeve contact configured to create an electrical connection with the plug sleeve contact when the plug is fully inserted into the jack and a jack tip contact configured to create an electrical connection with the plug tip contact when the plug is fully inserted into the jack. The jack sleeve contact is movable between a first position where there is a gap eliminating electrical connection between the jack sleeve contact and the plug sleeve contact when the plug is not inserted into the jack and a second position where the gap is closed, to create an electrical connection between the jack sleeve contact and the plug sleeve contact when the plug is fully inserted into the jack. A dog imparts movement to the jack sleeve contact, the dog being engaged by the tip of the plug when the plug is inserted into the jack to force the jack sleeve contact into electrical connection with the plug sleeve contact when the plug is fully inserted into the jack, wherein the plug tip is electrically protected from completing an electrical connection with the jack sleeve contact.

In one embodiment, the jack sleeve contact comprises a first sleeve contact member and a second sleeve contact member having a gap therebetween, to prohibit an electrical connection when the plug is not fully inserted into the jack, and a jack tip contact configured to create an electrical connection with the plug tip contact when the plug is fully inserted into the jack. The jack further comprises a dog which acts on the first sleeve contact member, the dog being engaged by the tip of the plug when the plug is inserted into the jack to force the first sleeve contact member into electrical connection with the second sleeve contact member. In this way, the plug tip is electrically protected from completing an electrical connection with the jack sleeve contact.

As used here, a “dog” is defined as “a tool or part of a tool that prevents or imparts movement through physical engagement.” For one embodiment, the dog imparts movement to the jack sleeve contact, or a first sleeve contact member, when physically engaged by the jack tip to push the jack sleeve contact, or first sleeve contact member, into electrical engagement with the plug sleeve contact. In a preferred embodiment, the jack tip contact comprises the dog and the dog engages the plug sleeve contact member with an insulator between the jack tip contact and the jack sleeve contact.

The insulator between the jack tip contact and the jack sleeve contact can be placed on either the jack tip contact or the jack sleeve contact, as long as the insulator prohibits electrical connection between these elements. The insulator is preferably configured from a slidable material, to allow movement of the jack tip contact on the jack sleeve contact member during insertion of the plug into the jack, but can be one or more anodized surfaces that render a portion of at least one of the jack tip contact and the jack sleeve contact member non-conductive in the area where they contact each other. In a most preferred embodiment, the insulator comprises a polytetrafluoroethylene (PTFE) or a similar material that has low electrical conductivity and a low coefficient of friction, an anodized, non-conductive surface on at least one of the jack tip contact and the jack sleeve contact, or combinations thereof.

In a preferred embodiment, the dog comprises an open, angled surface for aligning and directing the plug tip contact away from the jack sleeve contact while forcing the jack sleeve contact toward the plug sleeve contact during insertion of the plug into the jack. The angled surface also facilitates insertion of the plug into the jack where it gradually increases the force required to move the jack tip contact as the plug tip advances into the jack.

In a most preferred embodiment, the dog includes a peak and oppositely angled surface as it extends farther into the jack, for example in an hourglass configuration. This configuration permits the peak of the dog to rest within the depression around a standard plug near the top of the plug tip connector, to assist in holding the plug in the jack.

The jack may also include a flange at the open end of the jack, comprising a surface for a user to engage during removal of the plug from the jack. The flange located on the jack creates a solid, fixed element that provides positive engagement by the user. The present invention can also comprise two jacks with plugs and a cable therebetween to create a cable assembly for creating a connection, where the jacks preferably include flanges to aid in the insertion/removal of the plugs.

Generally, the plug tip carries the signal and the plug sleeve creates the ground, however, it is understood that other types of electrical connections may be carried by these conductors. It is also understood that one or more rings can be added to the plug/jack connection, with proper insulation, to conduct other signals without deviating from the claimed invention.

The structure of the present invention overcomes the problems associated with signal grounding between the plug tip contact and the jack sleeve contact that creates dropouts and excess current draw and causes signal disruption and audio distortion during insertion and removal of an audio plug from a jack.

BRIEF DESCRIPTION OF THE DRAWINGS

The attached drawings, in which like reference characters represent like parts, are intended to better illustrate a preferred embodiment of the present invention without limiting the invention in any manner whatsoever.

DETAILED DESCRIPTION OF THE PREFERRED EMBODIMENT

The following description of the preferred embodiment is presented to describe the present invention without limiting the scope of the appended claims in any manner whatsoever.

Figure 1:
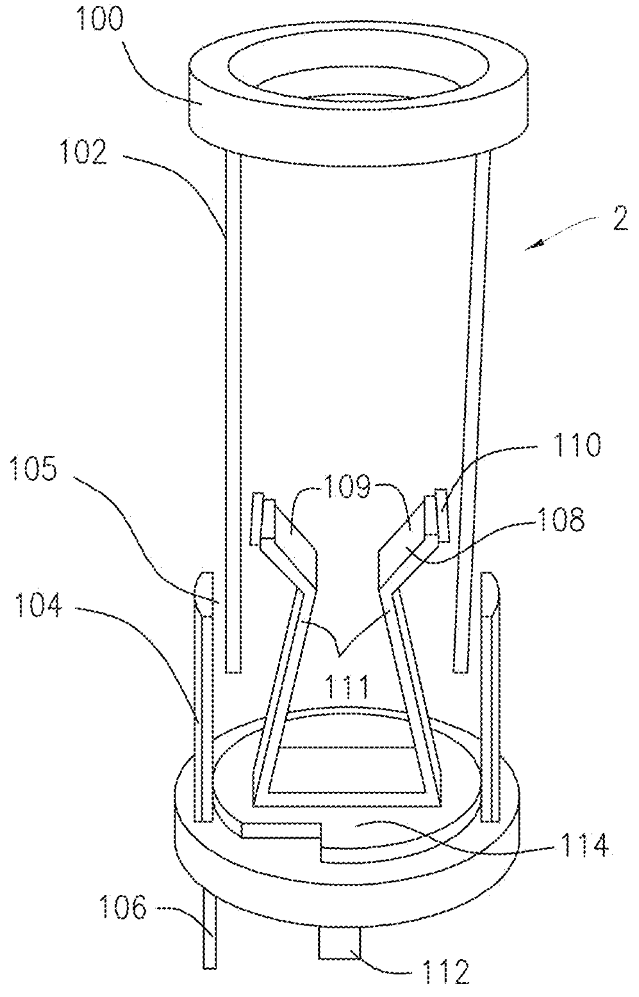
FIG. 1 is an elevation of the internal components of an embodiment of the jack of the present invention.
Figure 2:
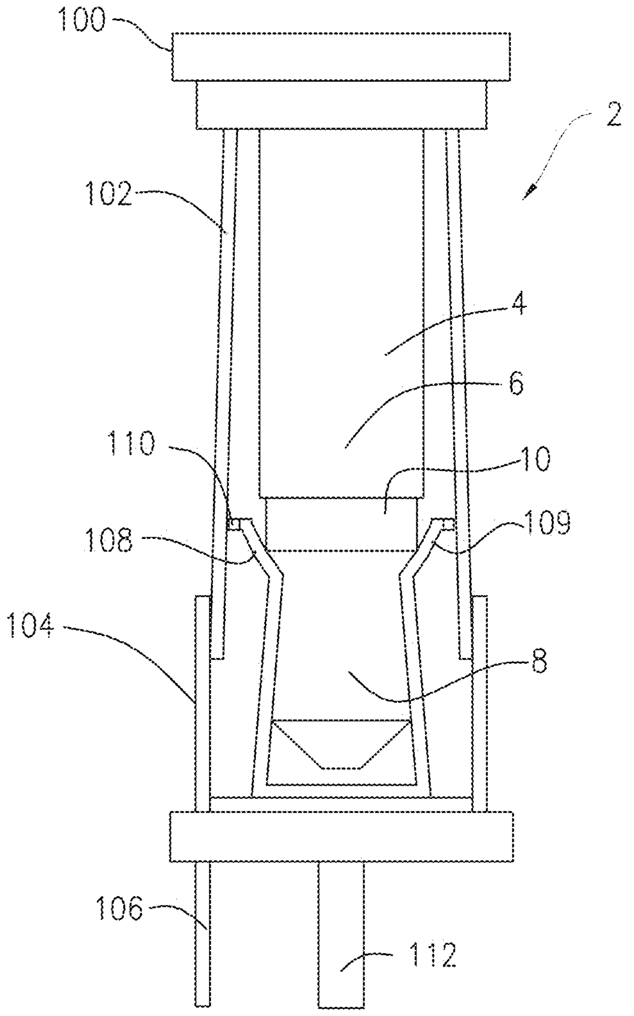
FIG. 2 is an elevation of an embodiment of a connector comprising the jack of the present invention of FIG. 1 with a plug inserted.

As best shown in FIGS. 1 and 2, the present claimed invention is directed to a jack 2 for receiving a plug 4 to make an electrical connection, preferably a phone jack or similar audio jack, said plug 4 having a plug sleeve comprising a plug sleeve contact 6 and a plug tip comprising a plug tip contact 8 separated by an insulator 10.

The jack 2 comprises a jack sleeve contact 100 configured to create an electrical connection with the plug sleeve contact 6 when the plug 4 is fully inserted into the jack 2. As shown in FIG. 1, the jack sleeve contact 100 comprises a first sleeve contact member 102 and a second sleeve contact member 104 having a gap 105 therebetween, to prohibit an electrical connection when the plug 4 is not fully inserted into the jack 2, and a jack tip contact 108 configured to create an electrical connection with the plug tip contact 8 when the plug 4 is fully inserted into the jack 2, as shown in FIG. 2.

The jack 2 further comprises a dog 109 which acts on the first sleeve contact member 102, the dog 109 being engaged by the tip of the plug 4 when the plug 4 is inserted into the jack 2 to force the first sleeve contact member 102 into electrical connection with the second sleeve contact member 104. In this way, the plug tip contact 8 is electrically protected from completing an electrical connection with the jack sleeve contact 104.

As used here, a "dog" is defined as "a tool or part of a tool that prevents or imparts movement through physical engagement." For the present embodiment, the dog 109 imparts movement to the first sleeve contact member 102 when physically engaged by the jack tip to push the first sleeve contact member 102 into electrical engagement with the second sleeve contact member 104 (see FIG. 2).

In a preferred embodiment shown in FIGS. 1 and 2, the jack tip contact 108 comprises the dog 109, shown as a protruding portion of the jack tip contact 108 that extends into the opening of the jack 2 for receiving the plug 4. The dog 109 shown in FIGS. 1, 2, 5-7, 9 and 10 acts on the first sleeve contact member 102 to move the first sleeve contact member 102 into electrical engagement with the second sleeve contact member 104 when the plug 4 is fully inserted. A dog insulator 110 is provided between the jack tip contact 108 and the first sleeve contact member 102 to prohibit the unwanted electrical connection between the jack tip contact 108 and the first sleeve contact member 102 as the jack tip contact 108 acts on the first sleeve contact member 102 during insertion of the plug 4 into the jack 2.

The insulator 110 between the jack tip contact 108 and the first sleeve contact member 102 can be on either the jack tip contact 108 or the first sleeve contact member 102, as long as the insulator 110 prohibits electrical connection between these elements. The insulator 110 is preferably configured from a slidable material, to allow movement of the jack tip contact on the first sleeve contact member during insertion of the plug into the jack, or may be an anodized area on at least one of the dog 109 or the first sleeve contact member 102. In a most preferred embodiment, the insulator comprises a polytetrafluoroethylene (PTFE) or a similar material that has low electrical conductivity and a low coefficient of friction, an anodized area on one or both of the dog 109 and/or the first sleeve contact member 102, or a combination thereof.

A second insulator 114, as generally known, is placed between the jack tip contact 108 and the second sleeve contact member 104. Similarly, the jack 2 includes a standard housing sleeve pin 106 and a standard housing tip pin 112 for connecting to ground and signal conductors on a printed circuit board. See FIG. 1. When jacks with multiple signal connections are used, rings are separated by similar insulators, as well known in the art.

In the preferred embodiment best shown in FIGS. 1, 2, 5, 6 and 7, the dog 109 comprises an open, angled surface for aligning and directing the plug tip contact 8 away from the first sleeve contact member 102, while forcing the first sleeve contact member 102 toward the second sleeve contact member 104 during further insertion of the plug 4 into the jack 2. The angled surface of the dog 109 also facilitates insertion of the plug 4 into the jack 2 where it gradually increases the force required to move the jack tip contact 108 as the plug tip advances into the jack 2.

In a most preferred embodiment, the dog 109 includes a peak and oppositely angled surface 111 as it extends farther into the jack 2, for example in an hourglass configuration. This configuration permits the peak of the dog 109 to rest within the depression around a standard plug near the top of the plug tip, to assist in holding the plug 4 securely within the jack 2, as shown in FIG. 2.

Figure 3:
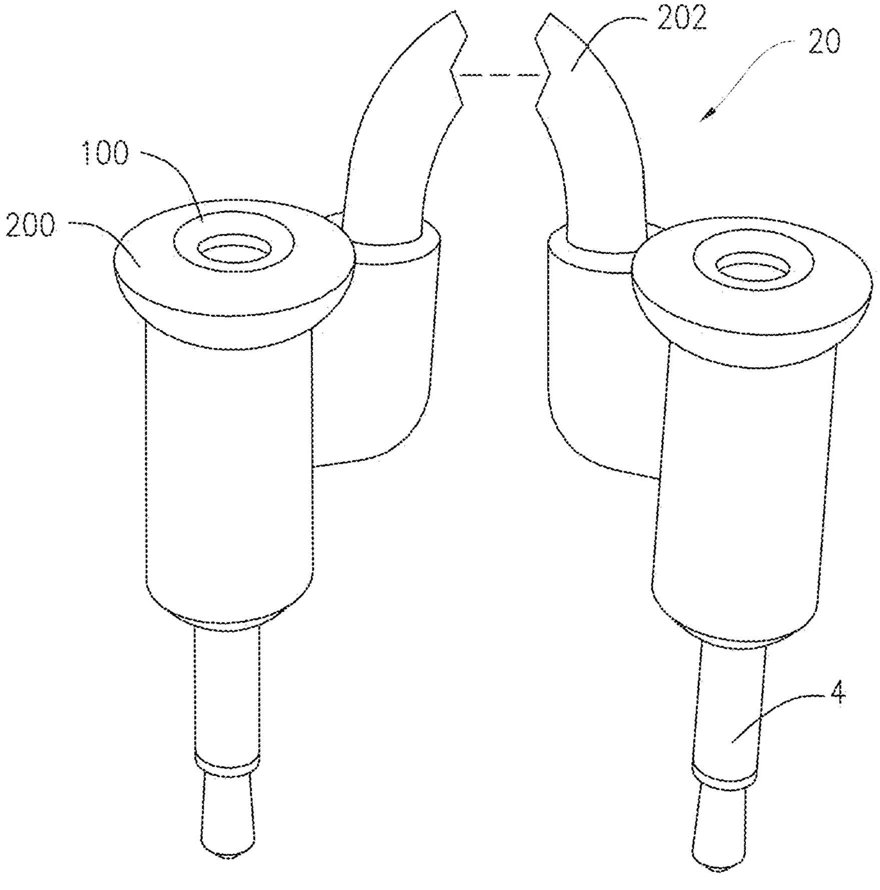
FIG. 3 is a cable with connectors at each end, the connectors comprising the jack of the present invention.
Figure 4:
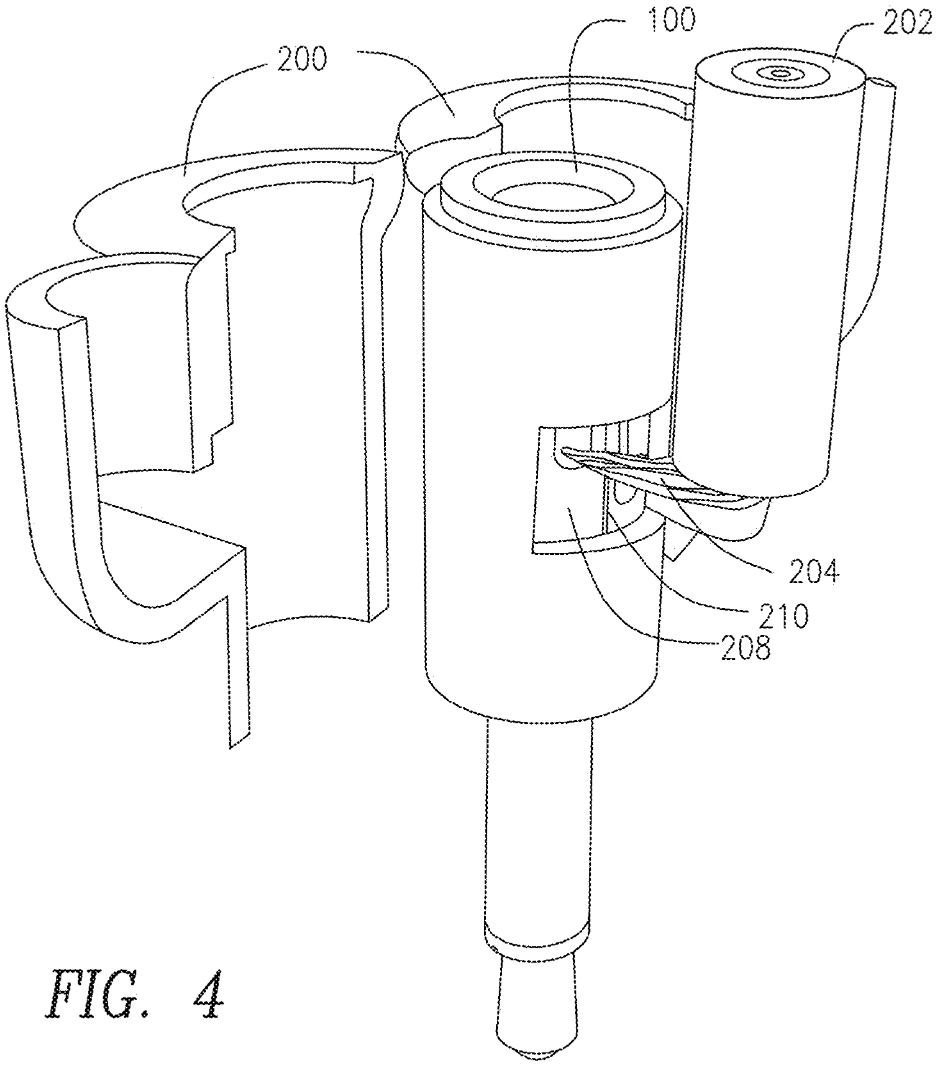
FIG. 4 is a partially exploded perspective view of one of the connectors of FIG. 3.
Figure 5:
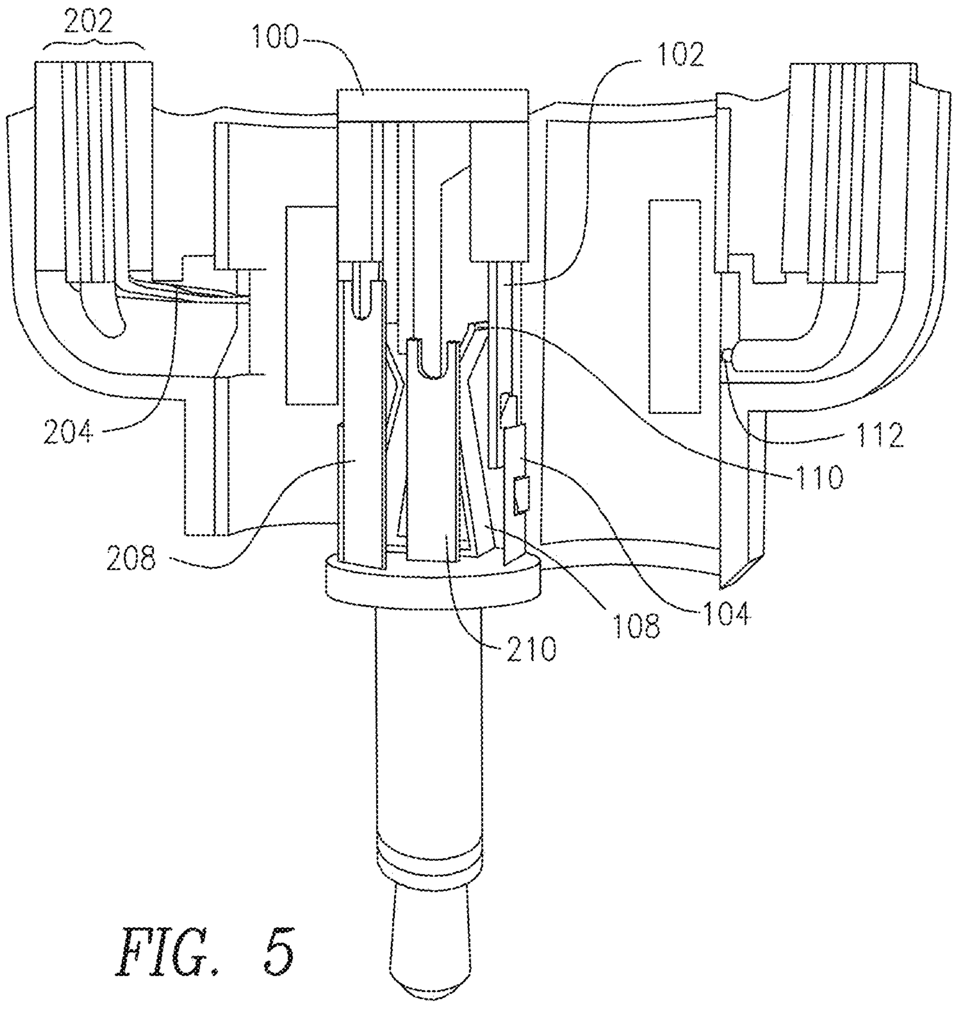
FIG. 5 is an exploded rear perspective view of one of the connectors of FIG. 3.
Figure 6:
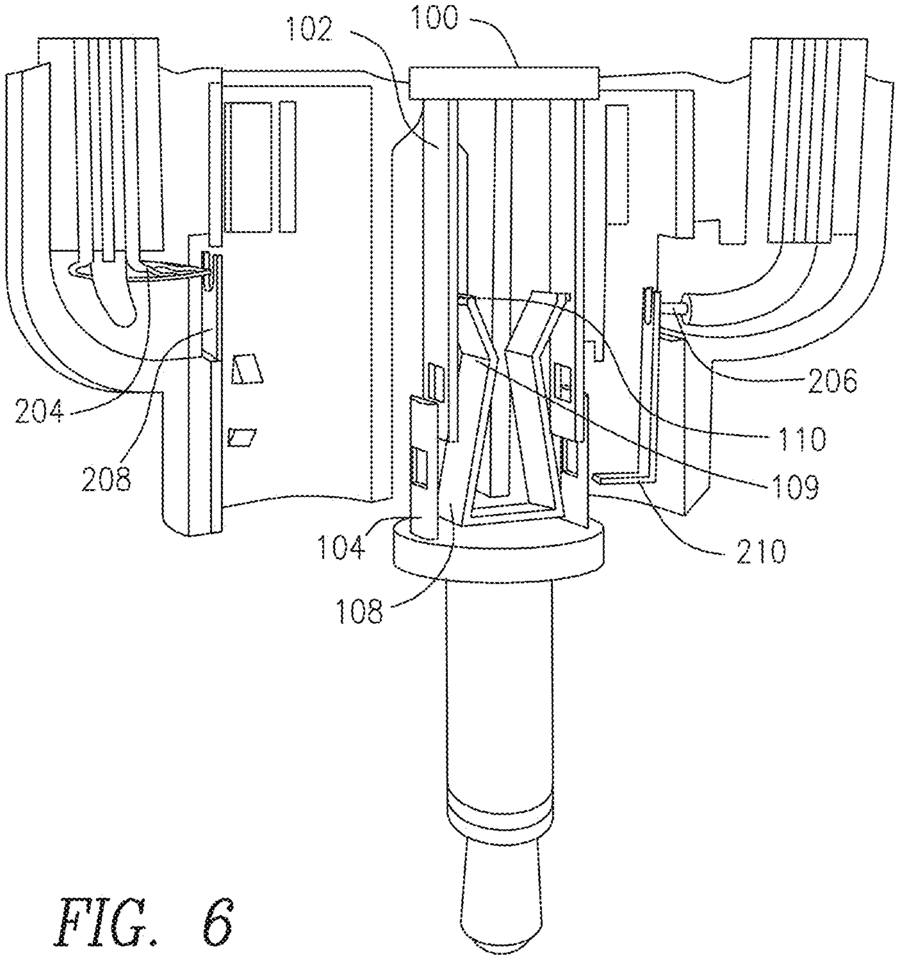
FIG. 6 is an exploded front perspective view of one of the connectors of FIG. 3.
Figure 7:
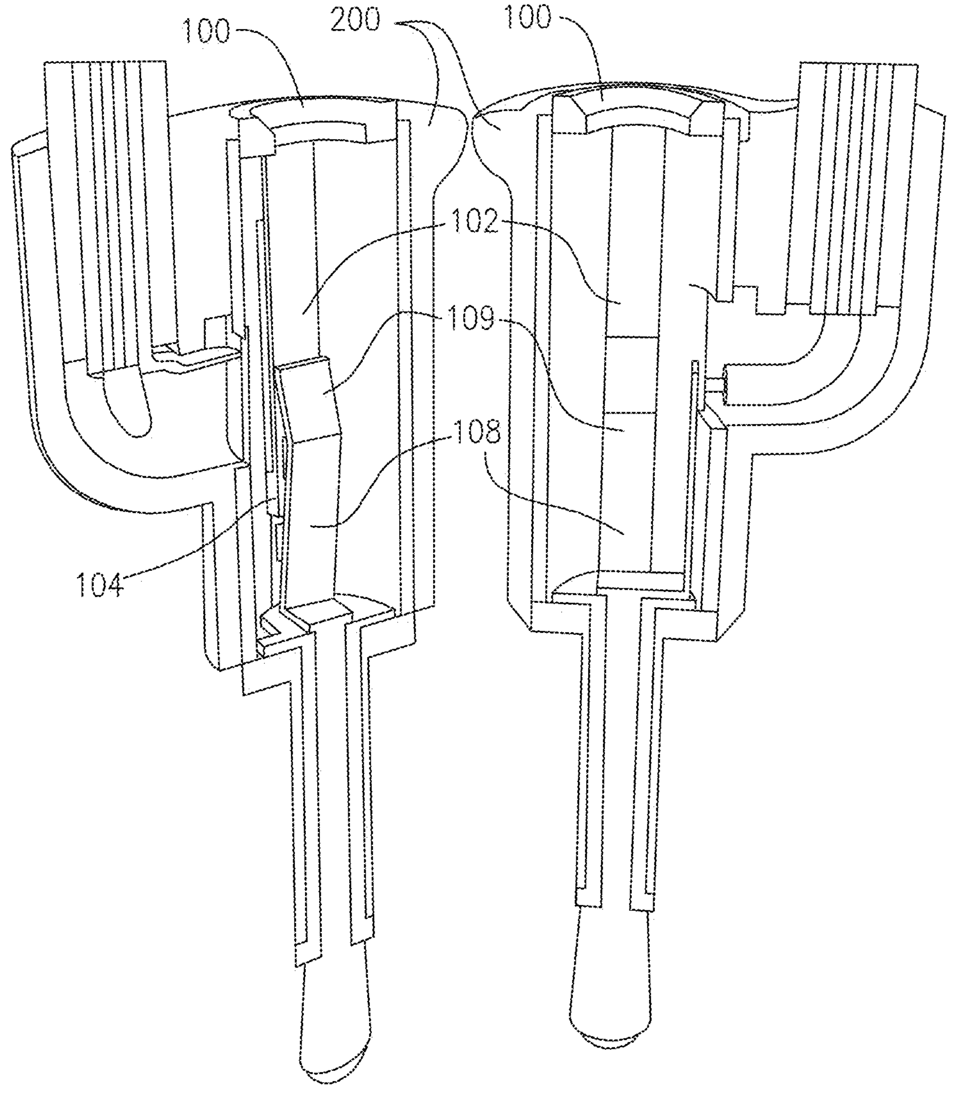
FIG. 7 is a cross sectional view of one of the connectors of FIG. 3.

As best shown in FIGS. 3, 4 and 7, the jack 2 may also include a flange 200 at the open end of the jack 2 for a user to engage during removal of the plug 4 from the jack 2. The flange 200 located on the jack 2 at the opening can take any shape and creates a solid, fixed element that provides positive engagement by the user during removal of the plug 4. In this regard, the only limitation to the flange 200 is that it provide sufficient surface area to be pressed down on by the user during removal of the plug 4 from the jack 2, preferably to enable removal of the plug 4 from the jack 2 with one hand.

The present invention can comprise a cable assembly 20 with one or more jacks 2, one or more plugs 4 and a cable 202 of any length therebetween. As shown in FIG. 3, a preferred cable assembly 20 comprises two jacks 2 with plugs 4 and a cable 202 to create a cable assembly 20 for an audio connection that can be any predetermined length. In the embodiment shown in FIG. 3, the jacks 2 forming connectors at the ends of the cable 202 preferably include a flange 200 on each jack 2 to aid in the insertion/removal of the plugs 4.

The interior components of the cable assembly 20 of FIG. 3 are shown in FIGS. 4-7. The interior components are shown to be substantially similar to the components shown in FIGS. 1 and 2, described above, with the cable 202 including a cable sleeve conductor 204 and cable tip conductor 206. The cable sleeve conductor 204 and cable tip conductor 206 are electrically connected to the sleeve solder tab 208 and tip solder tab 210 to connect the jack 2 to the cable 202.

Figure 8:
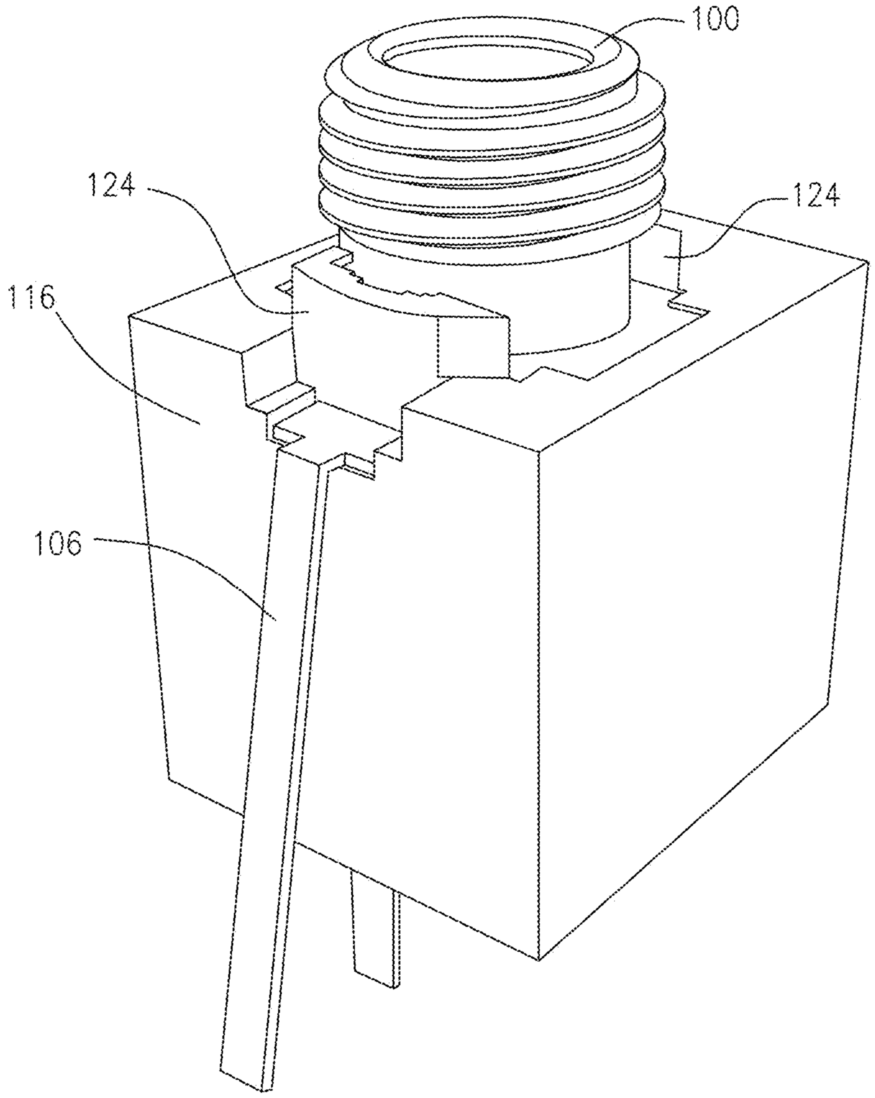
FIG. 8 is a side perspective view of an alternative embodiment of the jack of the present invention configured to be mounted on a printed circuit board.
Figure 9:
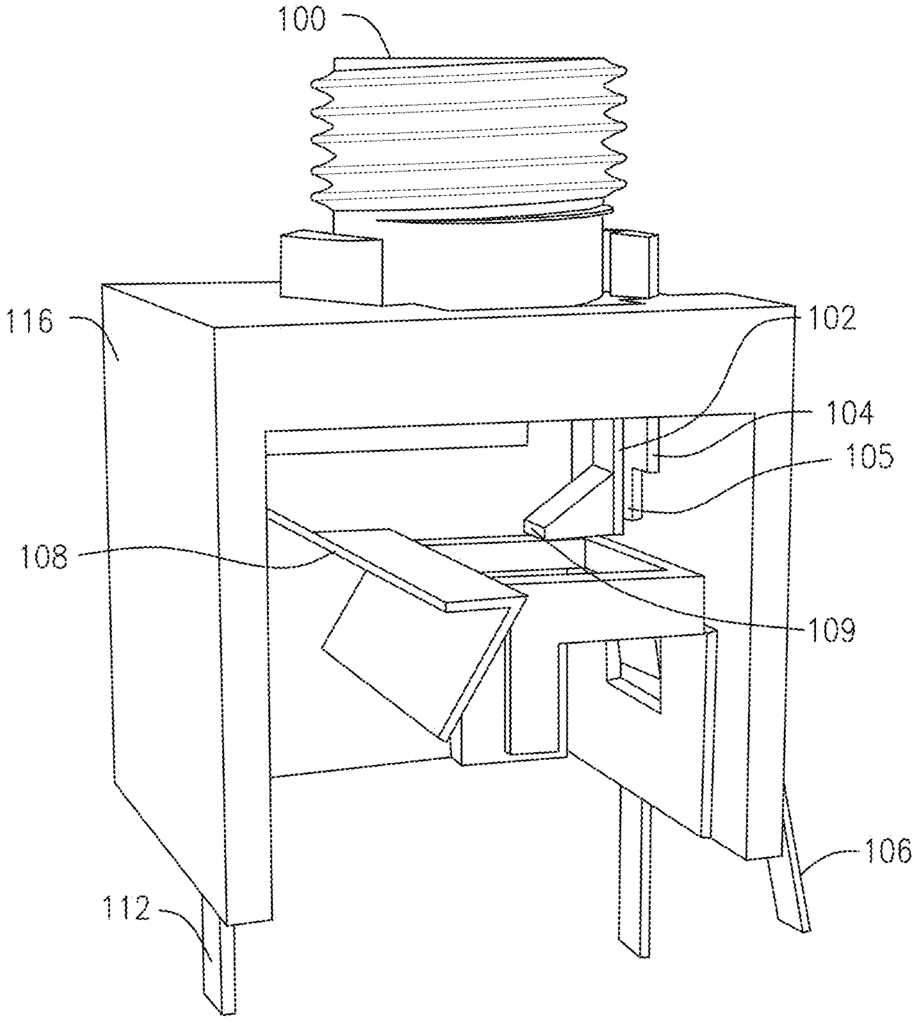
FIG. 9 is a cross sectional view of the alternative embodiment of the jack of the present invention shown in FIG. 8, but with an alternative bushing and dog.
Figure 10:
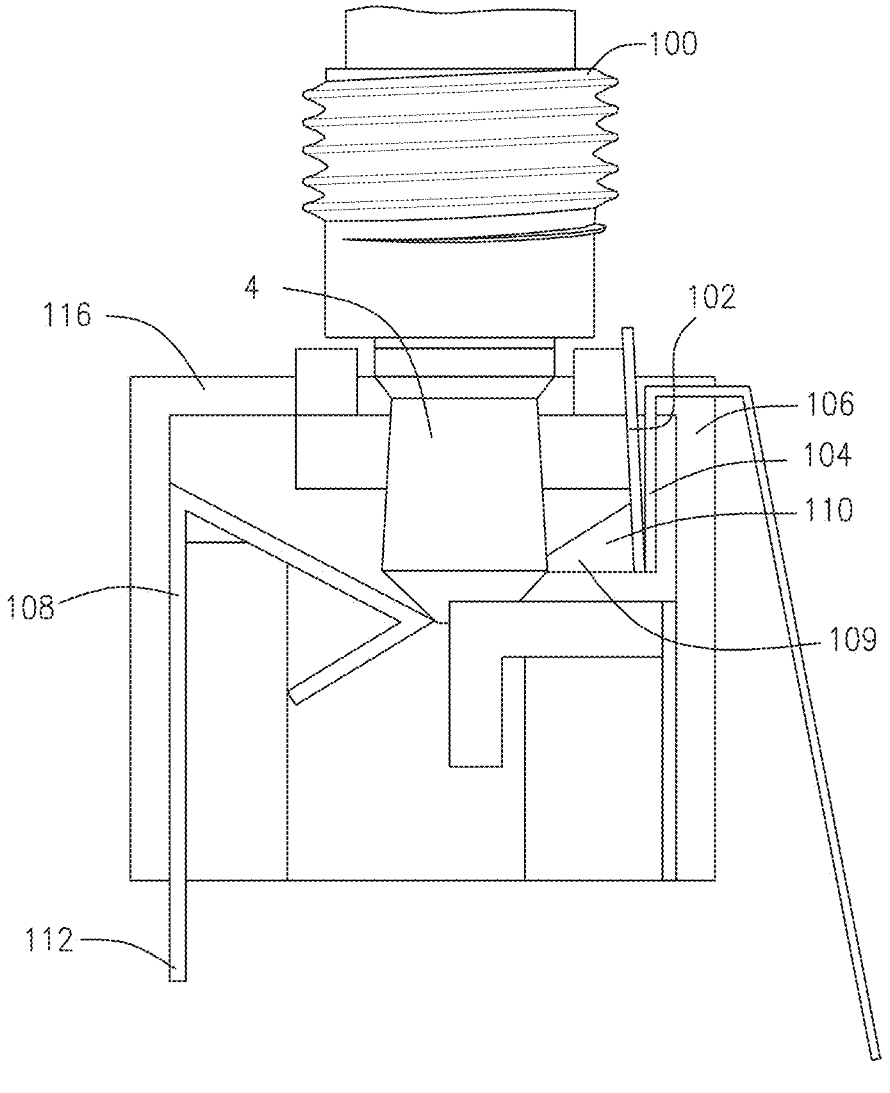
FIG. 10 is a cross sectional view of an alternative embodiment of the jack of the present invention shown in FIG. 8 with a plug partially inserted.

In an alternative embodiment configured for use on a printed circuit board, shown in FIGS. 8-10, the jack includes housing body 116 and jack sleeve contact insulators 124 to insulate the jack sleeve contact 110 from an electrically conductive front panel or chassis. In this embodiment, the dog 109 is configured from an insulator material, and is coupled to the first sleeve contact member 102. As the plug 4 is inserted into the jack 2, the plug tip pushes the dog 109, which moves the first sleeve contact member 102 into electrical engagement with the second sleeve contact member 104 when the plug 4 is partially inserted, as shown in FIG. 10.

For this embodiment, the space between the plug tip and sleeve contact is fairly small, i.e., only 0.7 mm, making it easy for the plug tip and plug sleeve to be electrically connected by the interior wall of the jack opening 100 during insertion, assuming the interior walls of the opening 100 are straight and conductive. In this embodiment, it is preferred that the interior walls of the jack opening 100 are recessed to prevent such a connection. Alternatively, the interior walls of the jack opening 100 can be configured as a non-conductive surface.

In this regard, it is typical that a front panel will lay down perpendicular to and rest on the top of this type of jack 2, so the bushing protrudes through a hole in the front panel. The raw machined sides of such holes are normally conductive and would connect the bushing, or jack sleeve contact, to the mounting chassis and defeat the goal of the present invention. A non-conductive barrier 124 between the conductive opening 100 and conductors, as shown in FIG. 8, or the use of a non-conductive opening 100 that prevents the conductive surfaces from touching each other, shown in FIG. 9, can overcome this problem.

FIG. 9 further differs from FIG. 8 where the insulator 110 is shown as a coating or treatment on the first sleeve contact member 102 which acts as the dog 109. Of course, any similar configuration where there is an insulator between the plug tip and the first sleeve contact member 102 could be used with this embodiment of the present invention.

Figure 11:
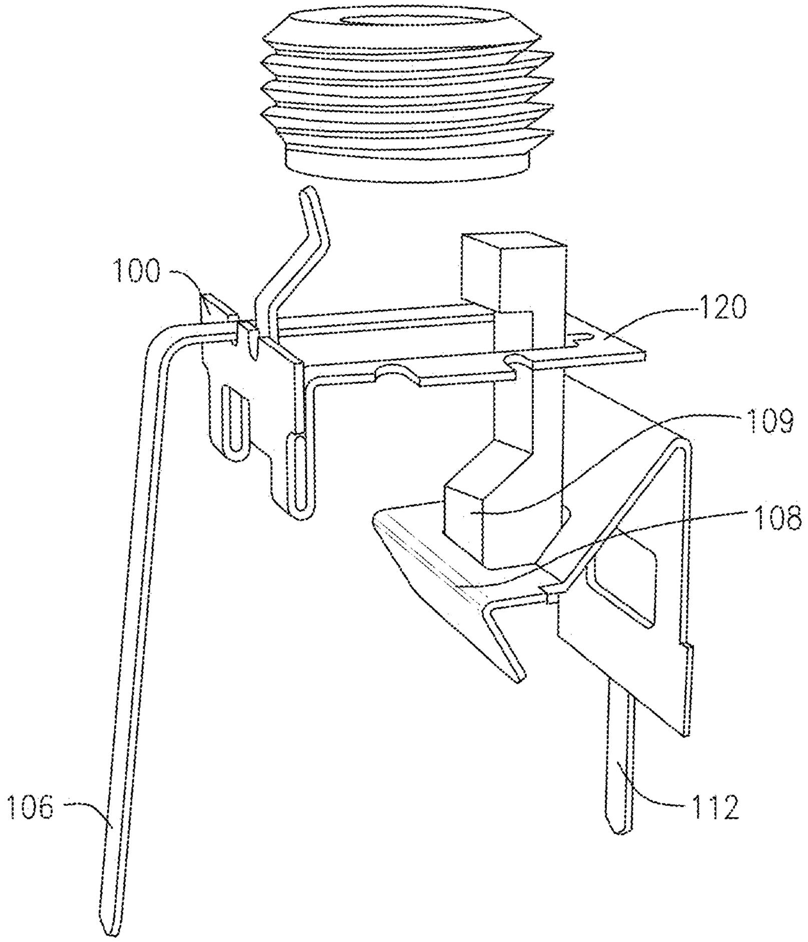
FIG. 11 is an elevation of the internal components of an embodiment of the jack of the present invention where the jack sleeve contact is movable to create an electrical connection with the plug sleeve contact.
Figure 12:
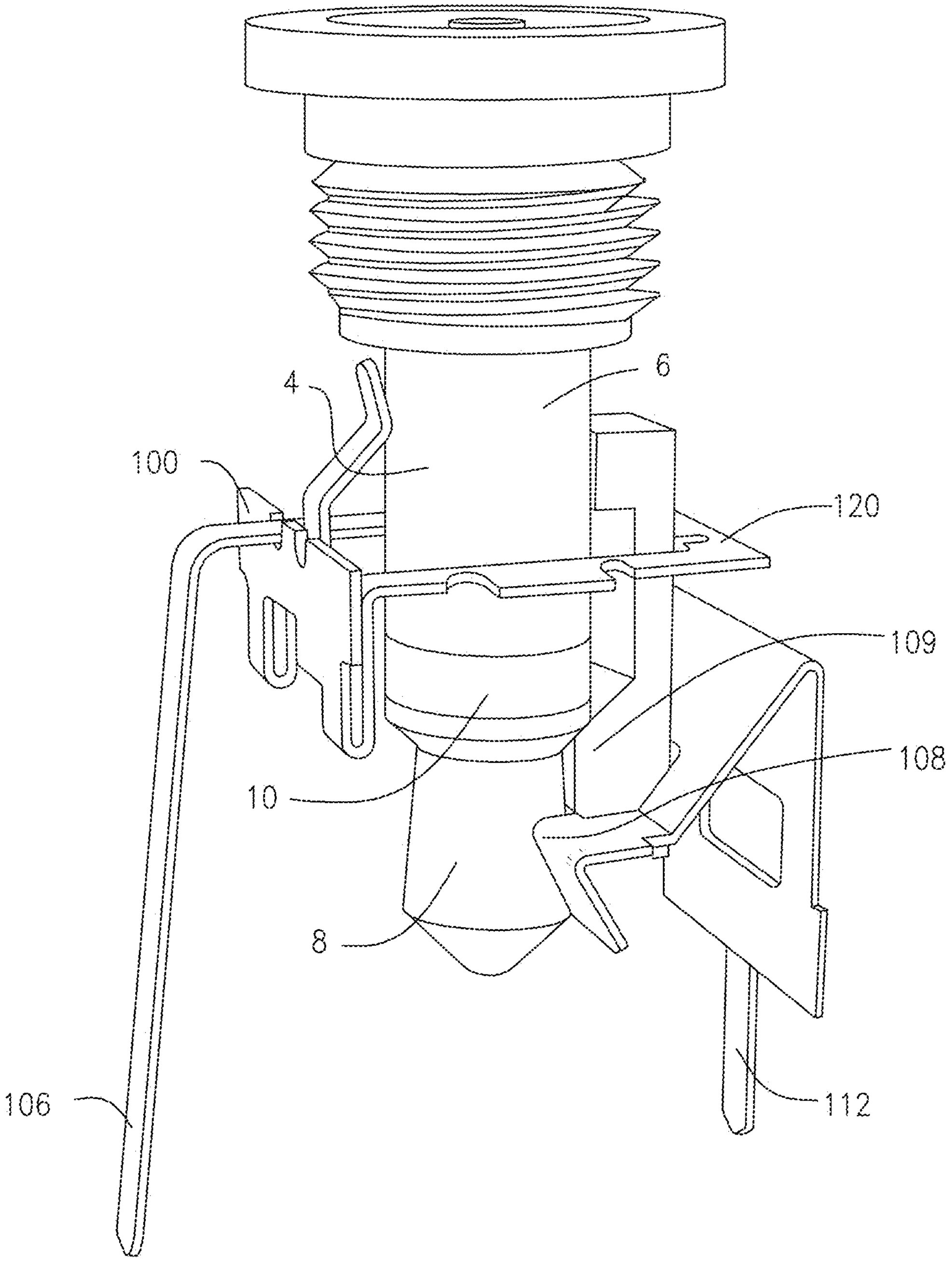
FIG. 12 is an elevation of the embodiment shown in FIG. 11 comprising the jack with a plug inserted and the jack sleeve contact in contact with the plug sleeve contact.
Figure 13:
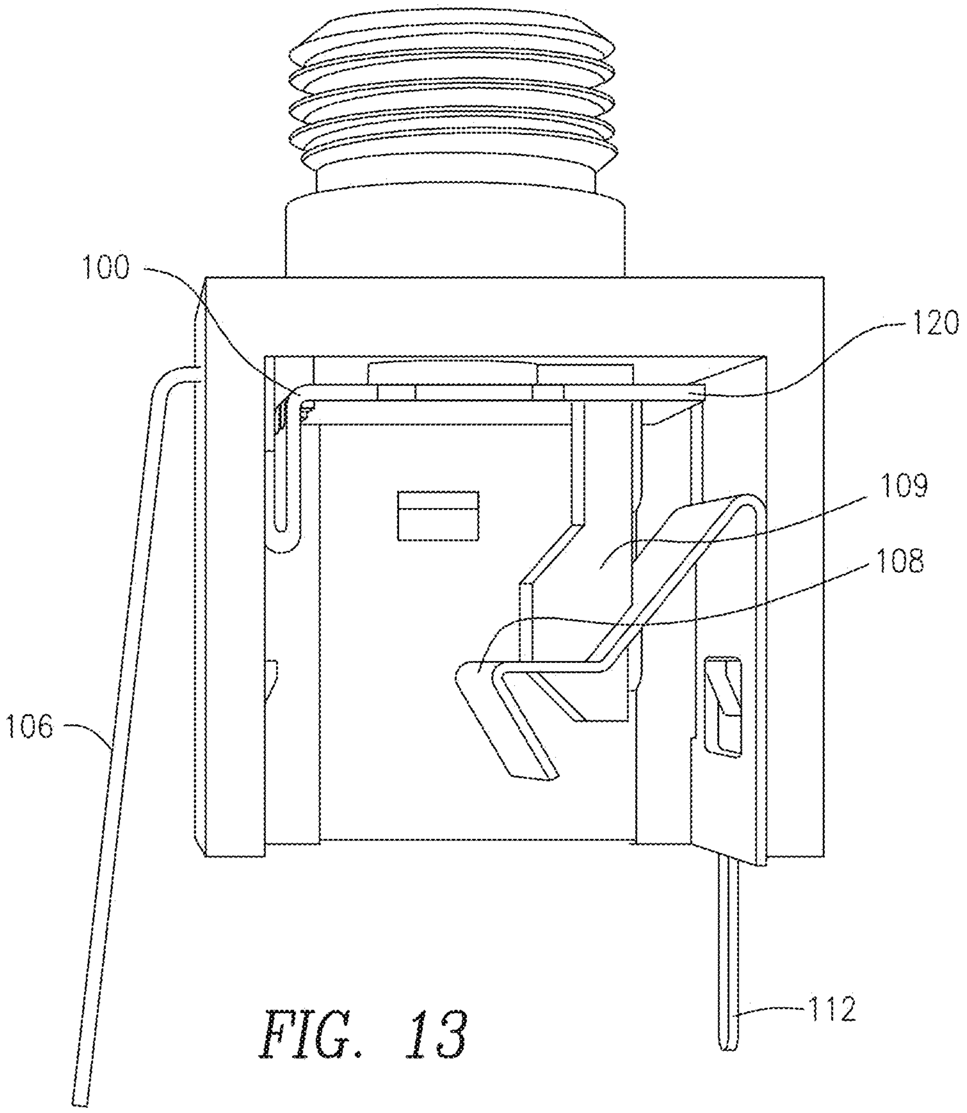
FIG. 13 is an elevation of the internal components of an embodiment of the jack of the present invention shown in FIG. 11 within a housing, where the jack sleeve contact is movable to create an electrical connection with the plug sleeve contact.
Figure 14:
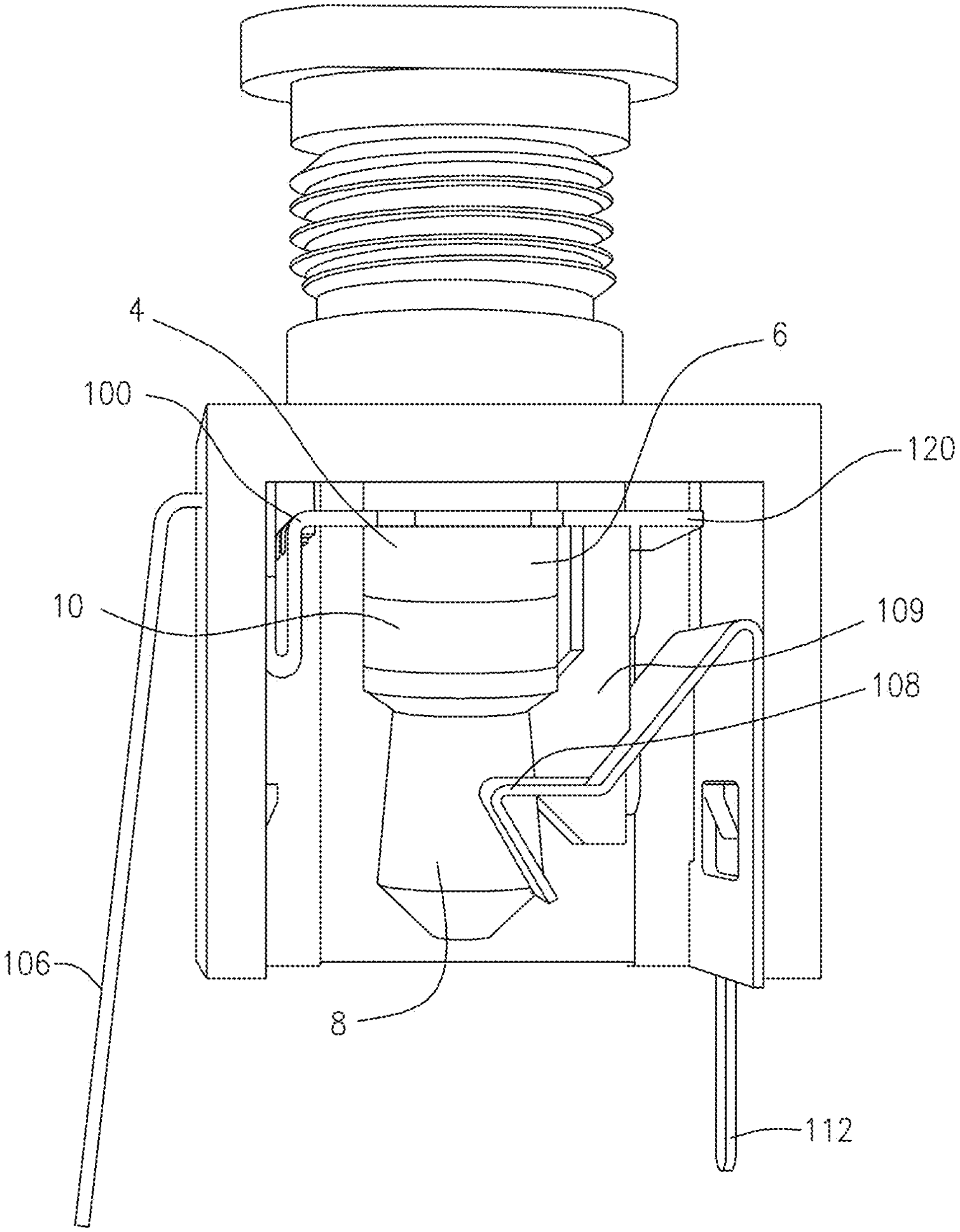
FIG. 14 is an elevation of the internal components shown in FIG. 13 comprising the jack with a plug inserted and the jack sleeve contact in contact with the plug sleeve contact.

FIGS. 11-14 show an embodiment of the present invention where the plug sleeve contact is a single member, not having first and second sleeve contact members. In this embodiment, the dog 109 moves the jack sleeve contact 100 into direct contact with the plug sleeve contact 6, where the gap is between the jack sleeve contact 100 and the plug sleeve contact 6 until the dog 109 moves the jack sleeve contact 100. More particularly, FIG. 11 shows the embodiment without the plug 4 inserted and FIG. 12 shows the embodiment having the plug inserted. Similarly, FIG. 13 shows the embodiment including the jack housing without the plug 4 inserted and FIG. 14 shows the embodiment including the jack housing with the plug inserted.

As can be seen from FIGS. 11-14, this embodiment illustrates how the dog 109 acts on an extended portion 120 of the jack sleeve contact 100 to draw the jack sleeve contact 100 into contact with the plug sleeve contact 6. Of course, the direct contact embodiment of FIGS. 11-14 can be used with the cable configuration shown in FIGS. 3-7 and described above.

Variations, modifications and alterations to the above detailed description will be apparent to those skilled in the art. All such variations, modifications and/or alternatives are intended to fall within the scope of the present invention, limited only by the claims. Any cited patents and/or publications are incorporated by reference.

I claim:

1. A jack for receiving a plug to make an electrical connection, said plug having a plug sleeve comprising a plug sleeve contact and a plug tip comprising a plug tip contact, said jack comprising:

a jack sleeve contact movable between a first position where there is a gap eliminating electrical connection between the jack sleeve contact and the plug sleeve contact when the plug is not inserted into the jack and a second position where the gap is closed, to create an electrical connection between the jack sleeve contact and the plug sleeve contact when the plug is fully inserted into the jack;

a jack tip contact configured to create an electrical connection with the plug tip contact when the plug is fully inserted into the jack;

a dog that imparts movement to the jack sleeve contact, the dog being engaged by the tip of the plug when the plug is inserted into the jack to force the jack sleeve contact into electrical connection with the plug sleeve contact when the plug is fully inserted into the jack, wherein the plug tip is electrically protected from completing an electrical connection with the jack sleeve contact.

2. The jack of claim 1 wherein the jack tip contact comprises the dog and the dog moves the jack sleeve contact, with an insulator between the jack tip contact and the jack sleeve contact.

3. The jack of claim 1 wherein the dog comprises an open, angled surface for aligning and directing the plug tip contact away from the jack sleeve contact while forcing the jack sleeve contact toward the plug sleeve contact during insertion of the plug into the jack.

4. The jack of claim 1 wherein the jack includes a plug, so that the jack can be used as part of a connector on a cable assembly.

5. The jack of claim 1 further comprising a surface configured for engagement of a user's fingers during removal of the plug from the jack.

6. The jack of claim 5 wherein the surface comprises a flange.

7. A cable assembly comprising at least a portion of a cable and at least one of the jack according to claim 1 at one end.

8. The cable assembly comprising the jack according to claim 1 at each end.

9. The cable assembly of claim 7 wherein the jack tip contact comprises the dog and the dog moves the jack sleeve contact member, with an insulator between the jack tip contact and the jack sleeve contact.

10. The cable assembly of claim 7 wherein the dog comprises an open, angled surface for aligning and directing the plug tip contact away from the jack sleeve contact while forcing the jack sleeve contact toward the plug sleeve contact during insertion of the plug into the jack.

11. The cable assembly of claim 7 wherein the jack includes a plug, so that the jack can be used as part of a connector on the cable assembly.

12. The cable assembly of claim 7 further comprising a surface configured for engagement of a user's fingers during removal of the plug from the jack.

13. The cable assembly of claim 12 wherein the surface comprises a flange.

* * * * *